United States Patent
Nagaoka

(10) Patent No.: US 11,248,666 B2
(45) Date of Patent: Feb. 15, 2022

(54) CLUTCH CONTROL SYSTEM

(71) Applicant: GKN Automotive Limited, Birmingham (GB)

(72) Inventor: Takahiro Nagaoka, Tochigi (JP)

(73) Assignee: GKN Automotive Limited, Birmingham (GB)

(*) Notice: Subject to any disclaimer, the term of this patent is extended or adjusted under 35 U.S.C. 154(b) by 0 days.

(21) Appl. No.: 16/922,003

(22) Filed: Jul. 7, 2020

(65) Prior Publication Data
US 2021/0010544 A1    Jan. 14, 2021

(30) Foreign Application Priority Data

Jul. 10, 2019 (JP) .............................. JP2019-128285

(51) Int. Cl.
*F16D 27/14* (2006.01)
*F16D 48/06* (2006.01)

(52) U.S. Cl.
CPC ............ *F16D 27/14* (2013.01); *F16D 48/06* (2013.01); *F16D 2500/1022* (2013.01); *F16D 2500/3022* (2013.01); *F16D 2500/30415* (2013.01); *F16D 2500/30426* (2013.01)

(58) Field of Classification Search
CPC ........ F16D 27/14; F16D 48/06; F16D 48/064; F16D 2500/1022; F16D 2500/3022
See application file for complete search history.

(56) References Cited

U.S. PATENT DOCUMENTS

| 3,172,515 | A | * | 3/1965 | Wrensch | ................. F16D 27/09 192/90 |
| 2011/0105264 | A1 | | 5/2011 | Maruyama et al. | |
| 2015/0354643 | A1 | * | 12/2015 | Ebuchi | ...................... B60K 6/38 192/69 |
| 2018/0281593 | A1 | * | 10/2018 | Yuasa | ................... F16D 48/064 |

FOREIGN PATENT DOCUMENTS

| DE | 102016219226 A1 | * | 4/2017 | .......... F16D 48/064 |
| JP | 2011099460 A | | 5/2011 | |
| WO | 2019111294 A1 | | 6/2019 | |

* cited by examiner

*Primary Examiner* — Charles A Fox
*Assistant Examiner* — Jessica L Burkman
(74) *Attorney, Agent, or Firm* — Bejin Bieneman PLC

(57) ABSTRACT

A system is configured to control a clutch that connects a first rotating body and a second rotating body. The system includes a biasing portion, an actuator, an energization device, and a control unit. The biasing portion permanently biases the clutch in a connecting direction. The actuator drives the clutch in a disconnecting direction. The energization device energizes the actuator. The control unit controls the energization device. The energization device outputs a first current value to the actuator when a connection of the clutch is detected even if a condition for permitting a disconnection is satisfied. The energization device outputs a second current value lower than the first current value when the condition for permitting the disconnection is satisfied and a disconnection of the clutch is detected.

5 Claims, 7 Drawing Sheets

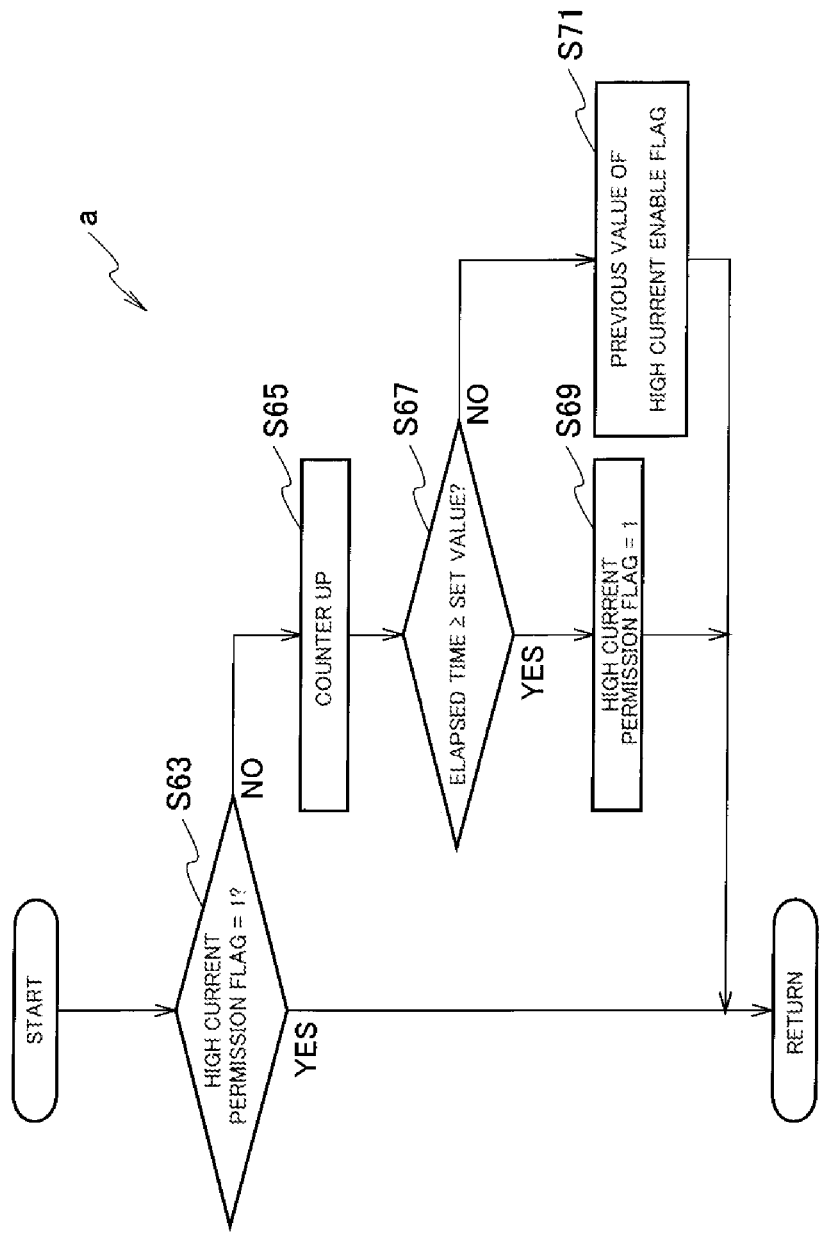

CLUTCH CONTROL SYSTEM

CROSS-REFERENCE TO RELATED APPLICATIONS

This application is based on and claims priority under 35 U.S.C. § 119 from Japanese Patent Application No. 2019-128285 filed on Jul. 10, 2019, the contents of which are incorporated herein by reference.

TECHNICAL FIELD

The following disclosure relates to a control system for temporarily disconnecting a clutch that is normally connected, and more particularly to a control system capable of suppressing energy consumption to maintain a state of the clutch.

BACKGROUND ART

Clutches are often used in rotary machines for a variety of purposes. For example, in a limited slip differential unit, a friction clutch is interposed between a side gear and a casing, and a differential motion between output gears is limited by the friction clutch. When slippage is not allowed, an engaging clutch such as a dog clutch is used. An example of a rotary machine using a dog clutch is a lock-up differential unit that temporarily prohibits differential motion.

In these examples, the clutch is disconnected in a normal state, and an actuator is used as necessary to connect the clutch.

WO2019/111294 and JP2011099460A disclose related techniques.

In the above-described device, it is possible to apply electric power to the actuator only in a relatively limited case, and energy consumption can be suppressed. However, in a specific device, it is necessary to normally maintain the clutch in a connected state for the purpose of ensuring safety and the like. Therefore, if the actuator continues to be operated, a large amount of energy consumption cannot be avoided. It is possible to prevent unintended disconnection by permanently applying a relatively strong biasing force to the clutch, but there is still a problem with energy efficiency since the actuator has to drive the clutch while resisting such a strong biasing force.

SUMMARY

A clutch control system includes a biasing portion, an actuator, an energization device, and a control unit. The biasing portion permanently biases the clutch in a connecting direction. The actuator drives the clutch in a disconnecting direction. The energization device energizes the actuator. The control unit controls the energization device. The energization device outputs a first current value to the actuator when a connection of the clutch is detected even if a condition for permitting a disconnection is satisfied. The energization device outputs a second current value lower than the first current value when the condition for permitting the disconnection is satisfied and a disconnection of the clutch is detected.

BRIEF DESCRIPTION OF DRAWINGS

FIG. 8 is another part of the flowchart when a high current is applied based on another example.

DESCRIPTION

Figure 1:
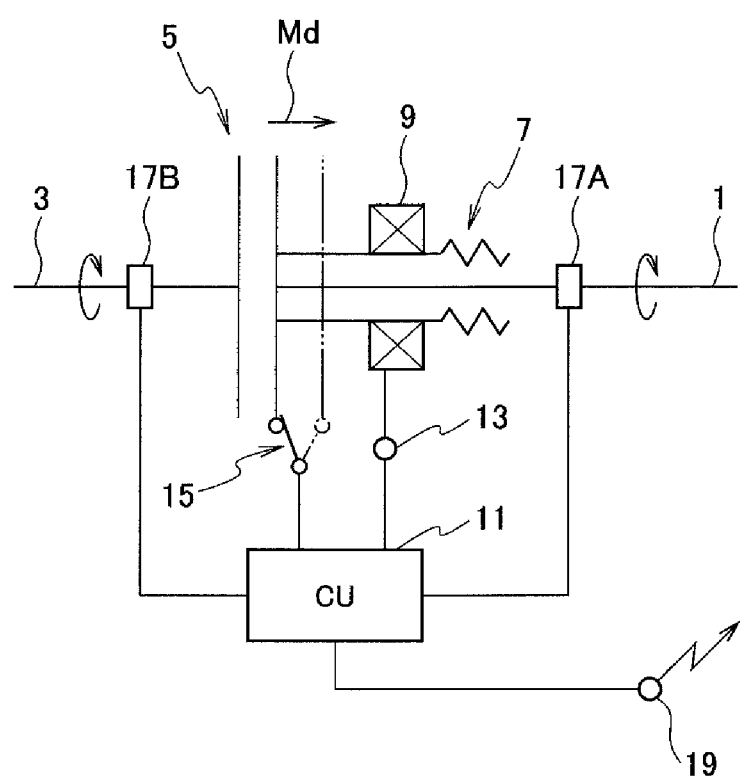
FIG. 1 is a schematic view of a control system.

FIG. 1 shows a control system. The control system is suitable for controlling a clutch 5 in a normally closed type in which a first rotating body 1 and a second rotating body 3 are normally connected. Of course, the control system can be applied to a clutch in a normally open type in which the first rotating body and the second rotating body are normally connected.

The clutch 5 may be a friction clutch such as a multi-plate clutch or a cone clutch, but the clutch 5 is usually an engaging clutch such as a dog clutch. One member of the clutch 5 is immovable in an axial direction, while the other member is movable in the axial direction as indicated by an arrow Md. Since a biasing portion 7 such as a spring is elastically connected to the movable clutch member and normally biases the movable clutch member in a direction opposite to the arrow Md, the clutch 5 is normally connected. An actuator 9 is connected to the movable clutch member, and the clutch 5 is disconnected when it is driven by the actuator 9.

The actuator 9 is, for example, a solenoid, a hydraulic device, a pneumatic device, a motor/cam mechanism, or the like that drives a plunger or the like in the axial direction by applying electric power. For example, the actuator 9 includes a solenoid that generates a magnetic flux according to the applied current, and a plunger that is attracted by the magnetic flux and drives the clutch 5 in a direction in which the clutch is disconnected. The biasing portion 7 may be in direct contact with the clutch member, or may be in contact with the plunger of the actuator 9. Moreover, the actuator 9 may directly drive a clutch member without having an independent plunger, or the actuator 9 may drive the clutch by moving the actuator 9 itself. In these cases, the biasing portion 7 may bias either of the clutch member or the actuator 9.

Figure 2:
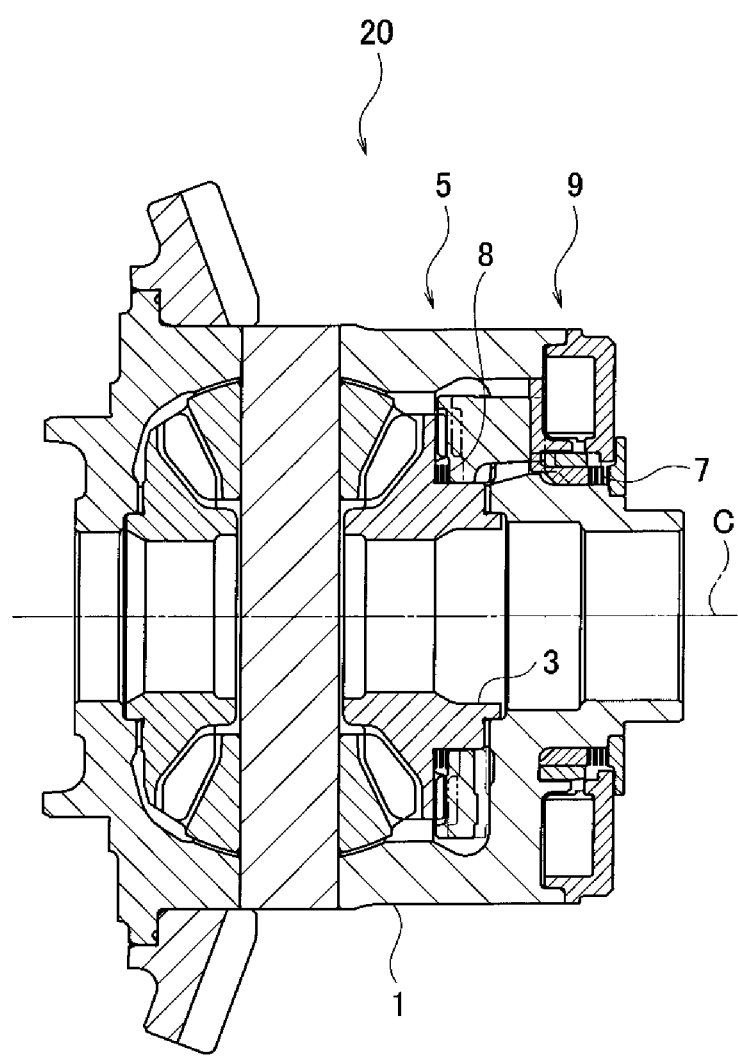
FIG. 2 is a cross-sectional view of a lock-up differential unit to which the control system is applied.

Such a system may be used, for example, in a final drive 20 shown in FIG. 2, which includes a temporarily functioning differential unit. In this device, the first rotating body 1 is a casing and the second rotating body 3 is a side gear connected to an axle, and the first rotating body 1 and the second rotating body 3 rotate about a common rotation axis C. Although such a device has a structure similar to the lock-up differential unit, the clutch 5 is normally connected by the biasing portion 7, and a differential motion does not occur between the left and right axles in the normal state. Only when electric power is applied to the actuator 9, the clutch 5 is disconnected, the differential gear functions, and the differential motion is allowed between the left and right axles.

Figure 3:
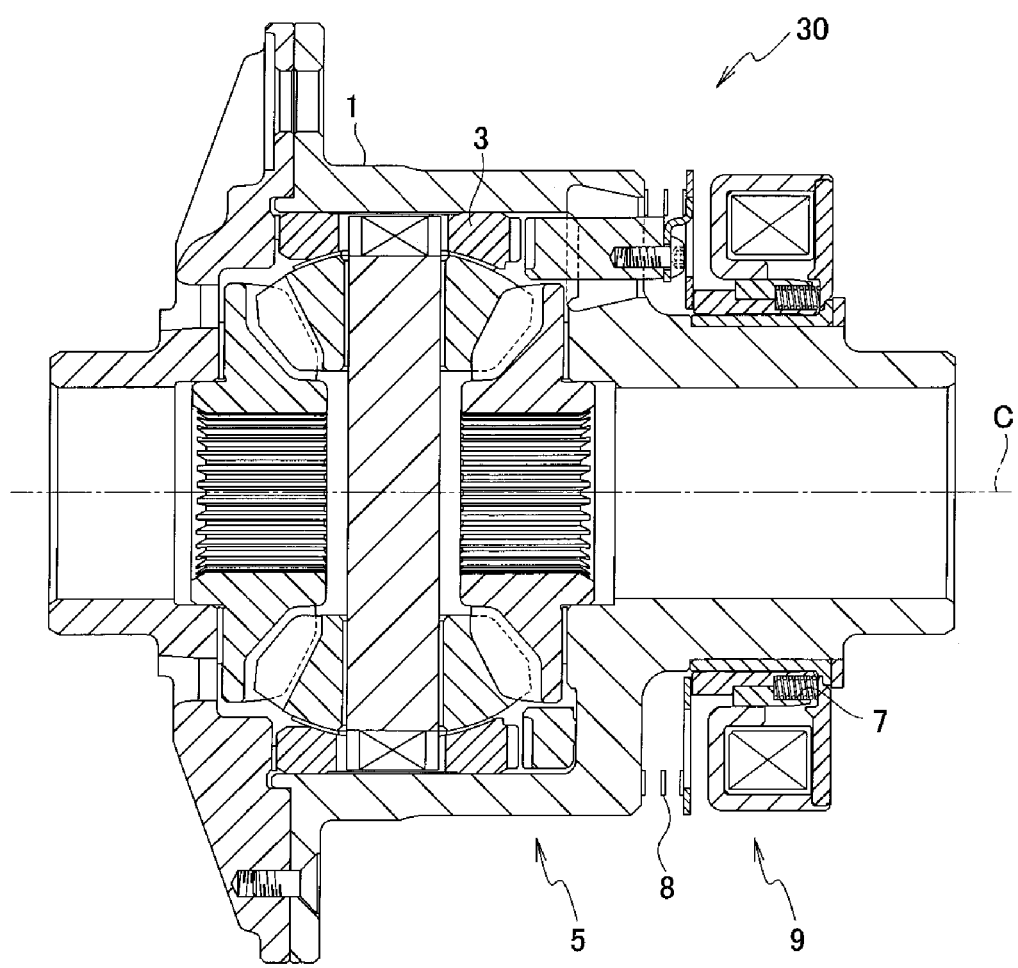
FIG. 3 is a cross-sectional view of a free running differential unit to which the control system is applied.

The system may also be used, for example, in a free running differential unit 30 shown in FIG. 3, which interrupts torque transmission only temporarily. In this device, the first rotating body 1 is an outer casing and the second rotating body 3 is an inner casing, and the first rotating body 1 and the second rotating body 3 rotate about the common rotational axis C. The inner casing includes clutch teeth or the inner casing is connected to a clutch member including the clutch teeth. The inner casing or the clutch member and another clutch member corresponding to the inner casing or the clutch member configure the clutch 5, and the biasing portion 7 normally biases the clutch 5 in the connected state. Although the inner casing is unmovable in the axial direction in the example of FIG. 3, the inner casing may be movable in another example and the biasing portion 7 and the actuator 9 may operate the movable inner casing. Clutch teeth that engage with the clutch teeth of the inner casing may be connected to the outer casing or integrally formed with the outer casing. Since the clutch 5 is normally connected, the torque input to the outer casing is transmitted to the inner casing and distributed to the left and right axles via the differential unit. Only when electric power is applied to the actuator 9, the clutch 5 is disconnected, and the inner casing becomes free from the outer casing, that is, the torque is not transmitted to the axle. Such a device is used, for example, in a part-time 4WD vehicle.

In addition, in any of the examples shown in FIGS. 2 and 3, in addition to the biasing portion 7, an additional biasing portion 8 for biasing the clutch member in the opposite direction may be provided, though not essential. Since the actuator 9 is needed to generate a large thrust force for separating the engaged clutch teeth, the additional biasing portion 8 helps to reduce the burden of the actuator 9 at such a stage and thereby reduce energy consumption.

The application of the control system is not limited to these examples, and may be applied to any rotary machine, such as a shift device, that needs to be temporarily disconnected or temporarily connected.

Referring back to FIG. 1, in order to control the actuator 9, the control system includes a control unit 11. The control unit 11 may be an electronic circuit for a specific use that works by hardware resources, but a computer chip working in cooperation with software may be suitably used. Further, as an example of the latter, an electronic control unit (ECU) or an equivalent thereof provided in order to control each unit of the vehicle may be exemplified, and the ECU may be connected to another ECU via a controller area network (CAN) communication bus.

The control unit 11 further includes an energization device 13 which is incorporated therein or as an external element, and is connected to a battery and capable of controllably supplying a current. The energization device 13 is electrically connected to the actuator 9, and outputs a current to the actuator 9 under the control of the control unit 11.

The control system further includes an appropriate device for detecting disconnection of the clutch 5. One example is a switch 15 mechanically connected to the movable clutch member, which is electrically connected directly or indirectly to the control unit 11 to provide a notification of the detection result. Alternatively, the switch 15 may not be mechanically connected to the clutch 5, and, for example, it is possible to use a non-contact sensor that detects, in a non-contact manner, that any one of the clutch members is in proximity. Examples of the non-contact sensor include, but are not limited to, a sensor that detects the proximity of a metal using high-frequency oscillation or a capacitance type sensor.

Other examples are speed sensors 17A, 17B that respectively detect the rotational speeds of the rotating bodies 1, 3, and these sensors are also electrically connected directly or indirectly to the control unit 11. For example, by comparing the detected values of the speed sensors 17A, 17B, the control unit 11 can determine whether or not the clutch 5 has been disconnected. Alternatively, it can be determined from a change in the current value flowing through the actuator 9 or an impedance change, or it can be determined by estimating the viscosity from the temperature of the lubricating oil. The determination may be performed autonomously by the control unit 11 or by another ECU. The determination may be made based on a single criterion, or may be determined based on two or more criteria.

The control system may also include an indicator 19 connected to the control unit 11, which may be provided, for example, on a console of the vehicle.

Figure 4:
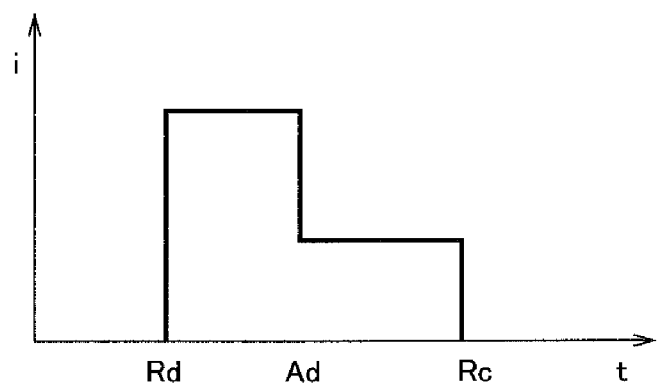
FIG. 4 is a graph schematically showing a current value change based on an example.

The energization device 13 outputs a current to the actuator 9 in the profile shown in FIG. 4, for example. That is, although the energization device 13 does not substantially output a current in the normal state, the energization device 13 outputs a high current sufficient for disconnecting the clutch 5 when there is a disconnecting request Rd. Next, when it is detected that the clutch 5 is in a disconnected state Ad, the energization device 13 outputs a lower current. The current value is sufficient to maintain the disconnected state against the biasing force of the biasing portion 7, and is considerably lower than the current value for positively disconnecting the clutch 5. The energization device 13 maintains the low current value until there is a connecting request Rc. When there is the connecting request Rc, the output of the current is substantially stopped, and the clutch 5 returns to the connected state by the biasing portion 7.

Here, even after the disconnected state Ad is detected, the current value may be maintained for a certain period of time without immediately reducing the current value. Such control is advantageous in that the operation of the disconnecting is ensured.

Figure 5:
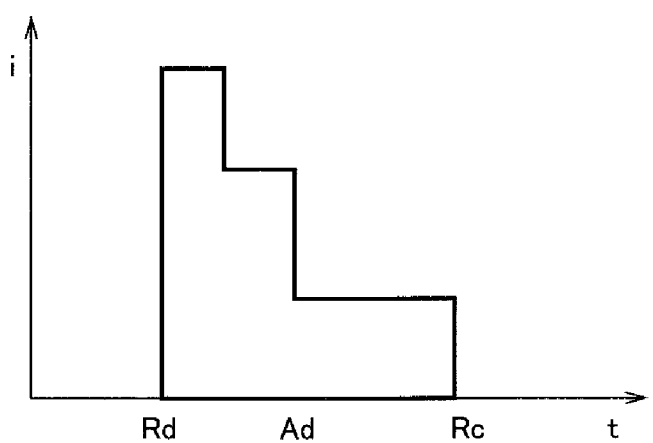
FIG. 5 is a graph schematically showing a current value change based on another example.

Alternatively, as shown in FIG. 5, the energization device 13 may be controlled to output a higher current immediately after the disconnecting request Rd. This not only makes helps the disconnection of the clutch 5, but also helps to expedite the disconnection and consequently also helps to reduce power consumption. After outputting a high current for a very short period of time, particularly a high current, similar to the high current as in the case of FIG. 4 is output, and if the disconnected state Ad is detected, the current value is further reduced. As above, the current value may be maintained for a certain period of time even after the disconnected state Ad is detected, and thereafter the current value may be reduced.

Figure 6:
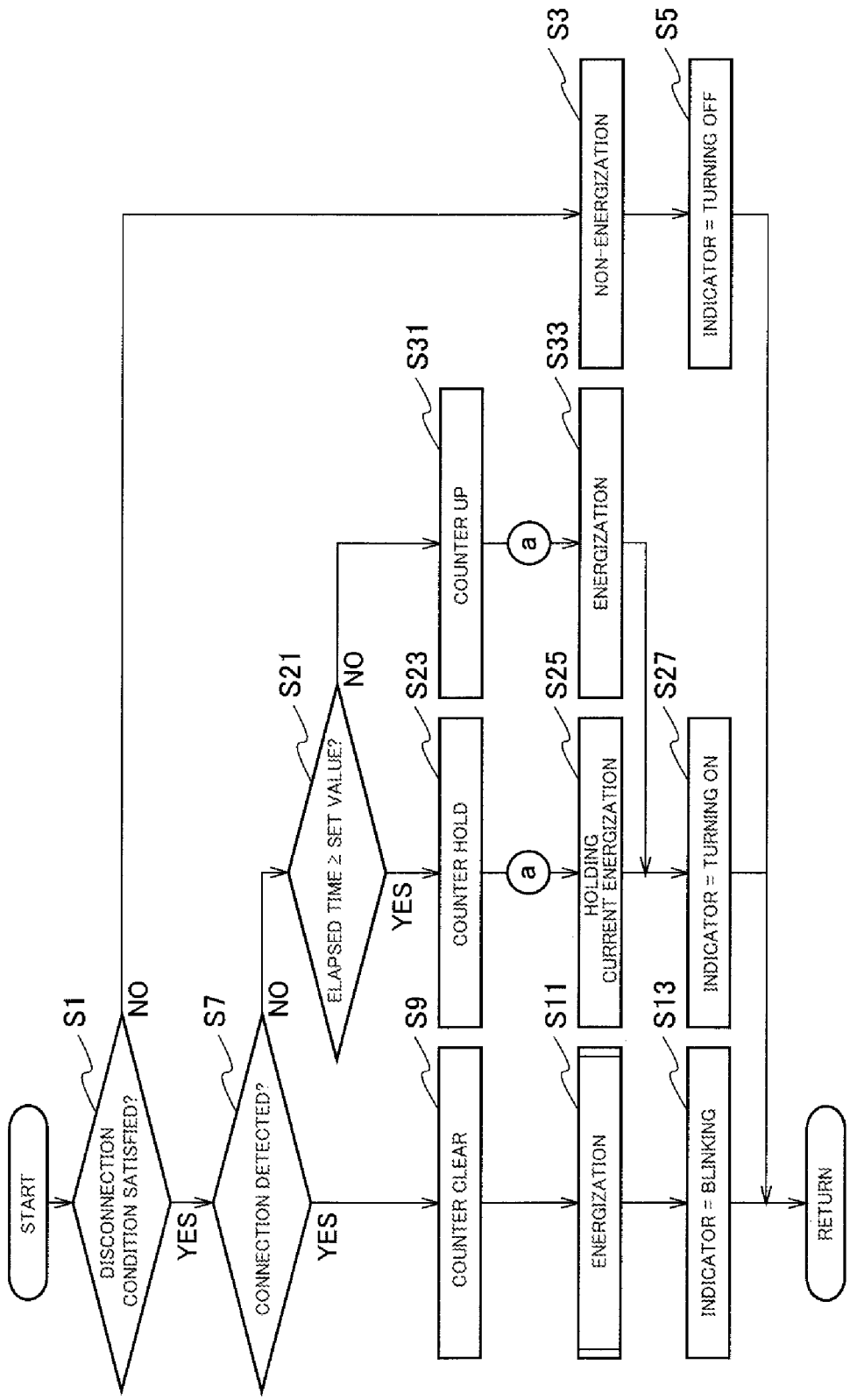
FIG. 6 is a flowchart of current value control based on an example.

The control unit 11 realizes the above-described current profile by operating according to the algorithm shown in FIG. 6, for example. The following algorithm may be executed only by the control unit 11, or may be executed in cooperation with another ECU.

First, the control unit 11 determines whether or not a condition for permitting the disconnection is satisfied (step S1). Such a condition can be satisfied when the control unit 11 receives the disconnecting request Rd. The request Rd may be caused by a switch operation by the driver or may be caused by communication from another ECU. Alternatively, the control unit 11 may autonomously make a determination according to one or more other conditions.

When the condition is not satisfied, the control unit 11 does not cause the energization device 13 to output a current and maintains the energization device in a non-energized state (step S3). When the indicator 19 is connected, for example, the indicator 19 is turned off (step S5).

When the condition is satisfied, then the control unit 11 determines whether or not the clutch 5 is connected (step S7). As described above, the determination is based on one or more of the switch 15 mechanically connected to the clutch 5, the non-contact sensor for detecting the proximity of the movable clutch member, the current sensor for measuring the current value to be applied to the actuator 9, and the speed sensors 17A, 17B.

The control unit 11 may include a counting portion for counting the elapsed time, which may be, for example, a counter on software, or a base clock or another independent clock for operating the control unit 11 may be used. When the connection is detected, the counter is cleared (reset to 0) (step S9).

When the connection is detected (Yes in step S7), the control unit 11 causes the energization device 13 to output a current sufficient to disconnect the clutch 5 to the actuator 9 (step S11). When the indicator 19 is connected, for example, the driver is informed of the operation state by, for example, blinking the indicator (step S13).

When the disconnection is detected (No in step S7), the control unit 11 causes the energization device 13 to output a current value lower than the above-mentioned high current value (step S25).

As described above, even after the disconnection is detected, it is possible to adopt a control for maintaining the current value for a certain period of time. In such a configuration, after the disconnection is detected (No in step S7), the control unit 11 determines whether or not the elapsed time recorded in the counter has reached the set value (step S21). When the set value has not been reached (No in step S21), the numerical value of the counter is increased (step S31), and the high current is maintained (step S33).

When the elapsed time has reached the set value (Yes in step S21), the control unit 11 holds the numerical value of the counter (step S23), and causes the energization device 13 to output a current value lower than the above-mentioned high current value (step S25).

In any case, when the indicator 19 is connected, for example, the driver is informed of the operating state by, for example, turning on the indicator (step S27).

The control unit 11 realizes the current profile shown in FIG. 4 by repeatedly executing the above-described algorithm.

When the energization device 13 outputs a low current value and maintains the disconnection, the control returns to step S25 as long as the disconnecting request Rd is output (YES in step S1), so that the holding current is maintained. Even if the clutch 5 is unintentionally connected (YES in step S7), the output is switched to the high current value (step S11), so that the clutch is guaranteed to be in the disconnected state again. When the connecting request Rc is issued (No in step S1), the control proceeds to step S3, so that the output is cut, and the clutch 5 is connected by the biasing portion 7.

In order to realize the current profile shown in FIG. 5, the algorithm is modified as follows. In this case, the control unit 11 may include a section for determining whether to permit a particularly high current, which is, for example, a flag on software.

Figure 7:
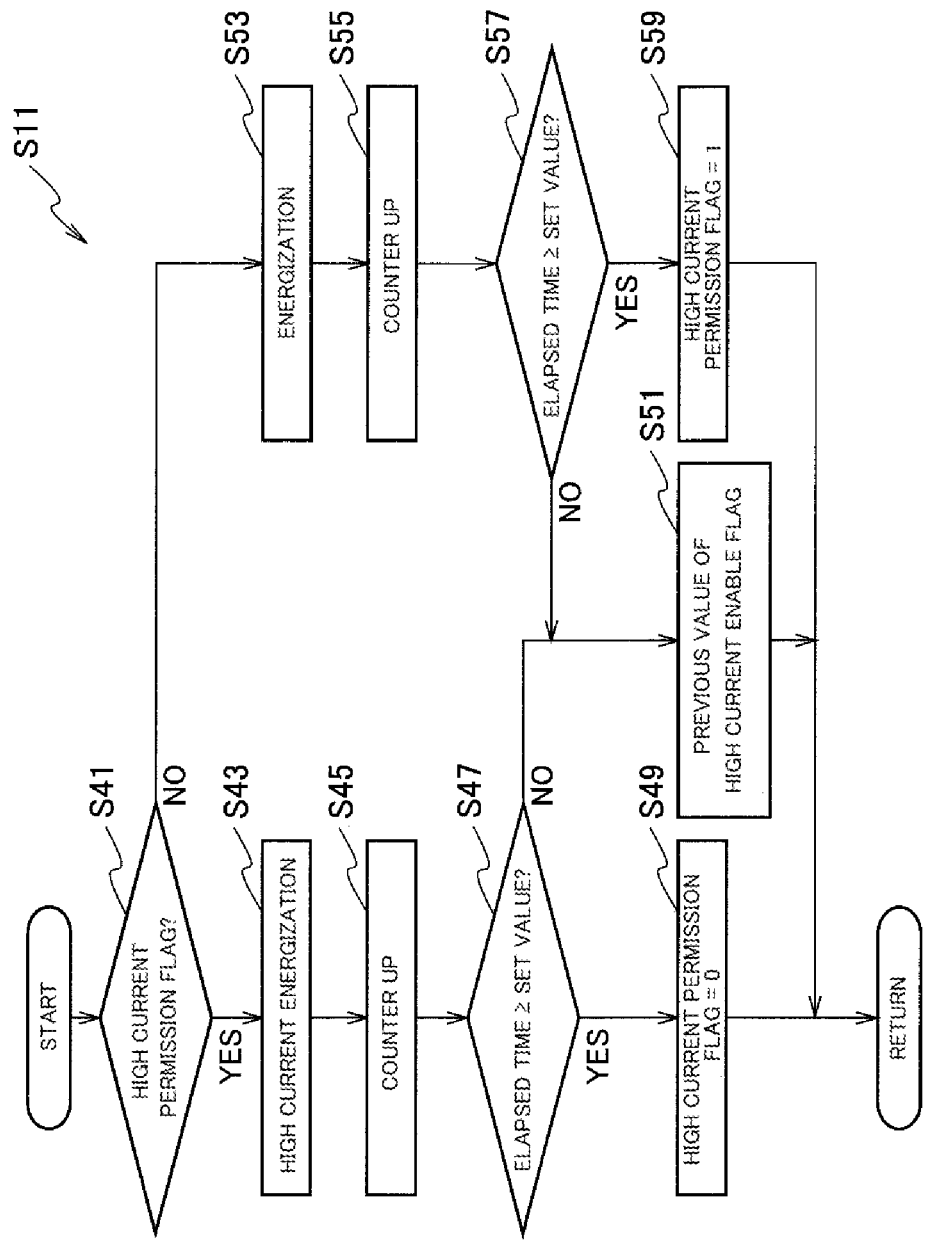
FIG. 7 is a part of a flowchart when a high current is applied based on another example.

Referring to FIG. 7, in step S11, it is determined whether or not a flag for permitting the particularly high current is set (i.e. the permission flag is 1) (step S41). When the permission flag is 1 (Yes in step S41), the control unit 11 causes the energization device 13 to output the particularly high current to the actuator 9 (step S43), and increases the numerical value of the counter (step S45). Next, when the elapsed time has reached the set value (Yes in step S47), the control unit 11 resets the permission flag to 0 (step S49), and when the elapsed time has not reached the set value (No in step S47), the permission flag is maintained (step S51).

When the permission flag is 0 (No in step S41), the control unit 11 causes the energization device 13 to output a current sufficient to disconnect the clutch 5 described above (step S53), and increases the numerical value of the counter (step S55). Next, when the elapsed time has reached the set value (Yes in step S57), the control unit 11 sets the permission flag to 1 (step S59), and when the elapsed time has not reached the set value (No in step S57), the permission flag is maintained (step S51).

Further, the following steps are inserted into the code "a" in FIG. 6. Referring to FIG. 8, when the high current permission flag is 1 (Yes in step S63), the control unit 11 moves the control to the next step, and when the high current permission flag is 0 (No in step S63), the numerical value of the counter is increased (step S65), and it is determined whether or not the elapsed time has reached the set value (step S67). When the elapsed time has reached the set value (Yes in step S67), the control unit 11 sets the permission flag to 1 (step S69), and when the elapsed time has not reached the set value (No in step S67), the control unit maintains the permission flag (step S71), and moves the control to the next step.

According to the modified algorithm, as shown in FIG. 6, the energization device 13 outputs a particularly high electric power for a certain period of time immediately after the disconnecting request Rd, thereby accelerating the disconnection of the clutch 5.

In any of the foregoing, the control system may provide an optimal current to the actuator at each stage, thereby allowing the clutch to respond quickly and reduce power consumption.

Although some examples have been described, modifications and variations of the examples may be made based on the above disclosure.

A temporary driving type clutch control system that is excellent in response and has good energy efficiency is provided.

In operating the clutch, a large current flows through the actuator only at a stage where a large driving force is required, so that an energy-efficient temporary driving type control system is provided.

What is claimed is:

1. A system for controlling a clutch that connects a first rotating body and a second rotating body, the system comprising:
    a biasing portion configured to permanently bias the clutch in a connecting direction;
    an actuator configured to drive the clutch in a disconnecting direction;
    an energization device electrically connected to the actuator and configured to energize the actuator;
    a control unit electrically connected to the energization device and configured to control the energization device; and
    a detection device electrically connected to the control unit and configured to detect whether the clutch is connected or disconnected and to input a detected state into the control unit;
    wherein the control unit is configured to cause the energization device to output a first current value to the actuator when a condition for permitting a disconnection is satisfied and the detection device detects that the clutch is connected, and wherein the control unit is configured to cause the energization device to output a second current value lower than the first current value when the condition for permitting the disconnection is satisfied and the detection device detects that the clutch is disconnected.

2. The system according to claim 1, wherein the detection device includes one or more of a switch that is mechanically connected to the clutch, a non-contact sensor that detects a proximity of a part of the clutch, a current sensor that measures a current value applied to the actuator, and a speed sensor that detects a speed of the first rotating body or the second rotating body.

3. The system according to claim 1, wherein the actuator includes a solenoid that generates a magnetic flux in response to an applied current, and a plunger that is attracted by the magnetic flux to drive the clutch in the disconnecting direction, and wherein the biasing portion includes a spring that biases the clutch in the connecting direction.

4. The system according to claim 1, wherein the control unit includes a counting portion that counts a time after the disconnection is detected, and wherein the control unit is configured to cause the energization device to output the second current value when the condition for permitting the disconnection is satisfied, the detection device detects that the clutch is disconnected, and the time has reached a set value; and wherein the control unit is further configured to maintain the first current value in the energization device after the disconnection is detected and while the time has not reached the set value.

5. The system according to claim 4, wherein the control unit is further configured to cause the energization device to output the first current value after outputting a third current value higher than the first current value.

* * * * *